June 27, 1967 — T. K. KEHLER — 3,327,731
PLATE VALVE
Filed Sept. 30, 1963 — 2 Sheets-Sheet 1

Inventor
THEODOR KARL KEHLER
By Watson, Cole, Grindle & Watson
Attys.

June 27, 1967 T. K. KEHLER 3,327,731
PLATE VALVE
Filed Sept. 30, 1963 2 Sheets-Sheet 2

Inventor
THEODOR KARL KEHLER
By
Watson, Cole, Grindle & Watson
Attys.

United States Patent Office 3,327,731
Patented June 27, 1967

3,327,731
PLATE VALVE
Theodor Karl Kehler, Vienna, Austria, assignor to Hoerbiger Ventilwerke Aktiengesellschaft, Vienna, Austria
Filed Sept. 30, 1963, Ser. No. 312,755
Claims priority, application Austria, Oct. 4, 1962,
A 7,856/62
5 Claims. (Cl. 137—516.13)

The present invention relates to a plate valve, in particular for piston-type compressors, comprising a valve seat with flow ports therein and a valve guard arranged in spaced relation to the valve seat, a closing member disposed between the valve seat and the valve guard and consisting of a solid flexible valve plate spring-loaded by closing forces, for example by means of one or a plurality of spring plates, helical springs or the like.

According to conventional design, the plate-shaped closing members of valves are given greater flexibility both in the direction of their plane and in perpendicular relation thereto by various measures, thereby reducing the inherent stress of the valve plate, in particular the internal stresses due to irregular heating, while at the same time permitting elastic deformation of the valve plate in operation in response to the action of certain forces, particularly to the pressure of the controlled medium and the closing forces. Consequently, the valve plate will not simultaneously impinge with its entire surface upon the valve seat and the valve guard, thereby attenuating the impact upon the valve guard and the valve seat, resulting likewise in greater quietness of operation. In addition, the damping of the impact and the reduction of inherent stresses increases the life of the valve plate.

In a conventional valve of this type the valve plate consisting of a plurality of rings is subdivided into various sectors by radial notches provided in the webs interconnecting the rings. Similar methods of subdividing valve plates have not, however, proved advantageous in every instance. Also, single or multiple ring valves have been known to comprise valve plates subdivided by slots to a considerable extent, the inner rings of the valve plate being transformed into guides. However, these valve plates equipped with closing springs or without, act more or less flap-fashion, uncovering substantial sections of the stroke gap only incompletely, thereby noticeably increasing the resistance to flow. Besides, excessive subdivision of the valve plate is liable to entail sealing difficulties at the crossing of the sealing strips on the valve seat and the indentations on the valve plate produced as a result of the subdivision.

It is the object of the present invention to provide a plate valve obtaining the advantageous flexibility of the closing member by a different method which affords the additional advantage of adapting the elastic behaviour of the closing member, particularly during the opening and closing operations of the valve, to given requirements and operating conditions.

The invention provides for a valve plate comprising at least two rigid zones flexibly interconnected by means of flexible intermediate zones and loaded by closing forces of different amounts. The valve plate according to the invention is sufficiently flexible both in the direction of its plane and in perpendicular relation thereto, so as to equalize such heat tensions as may occur and to be capable of deformation in response to the load to which it is subjected. Another advantage is derived from the fact that by altering the closing forces bearing on the various zones of the valve plate the elastic behaviour of the valve plate can also be adapted to individual requirements. The various zones open and close the associated ports of the valve seat in accordance with the closing forces of different amounts at different moments, as a result of which the opening and closing operations are damped, which is a noteworthy advantage in particular for high-speed piston-type compressors. Consequently, the valve works quietly and pressure peaks as revealed by the diagram are reduced. Therefore, the plate valve according to the invention will also have an exceptionally long life.

According to a preferred embodiment of the invention, both the rigid zones and the flexible intermediate zones can control ports of the valve seat and perform the full stroke motion of the valve, thereby achieving a large throughput and a small resistance to flow even at relatively minor dimensions of the valve.

In a further embodiment of the invention featuring an annular arrangement of ports in the valve seat and an annular valve plate, the rigid zones of the valve plate can comprise one or a plurality of solid rings, whereas the flexible zones consist of ring segments, each of said ring segments being connected with the adjacent solid ring by means of a web. The ring segments preferably adjoin only one of the solid rings at each extremity and serve as flexible arms so as to permit elastic axial displacement of the rigid zones relatively to each other over a comparatively wide ringe. Another advantage of this embodiment resides in the simple design of the valve plate. In addition, the ring segments are particularly suitable for the control of ports.

According to another feature of the invention, one of the rigid zones of the valve plate, such as the innermost rigid zone of ring valves, can be free from any spring load, the said zone opening easily and quickly, whereas the spring-loaded zones open at a later stage only. This simple embodiment of the invention requiring a lesser number of closing springs is particularly advantageous for smaller valves, such as for ring valves of small diameters and comprising a few rings only.

Further details of the invention will appear from the following description of several embodiments of the invention with reference to the accompanying drawings in which.

Figure 1:
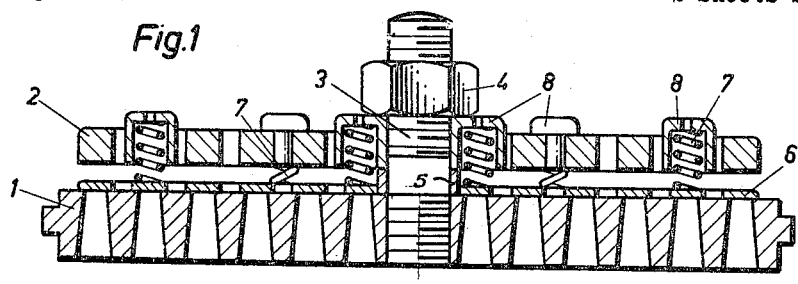
FIG. 1 shows an axial cross-sectional view of a plate valve according to the invention, FIG. 2 a plan view of its valve plate, FIGS. 3 and 4 each representing plan views of a valve plate of a different design.
Figure 2:
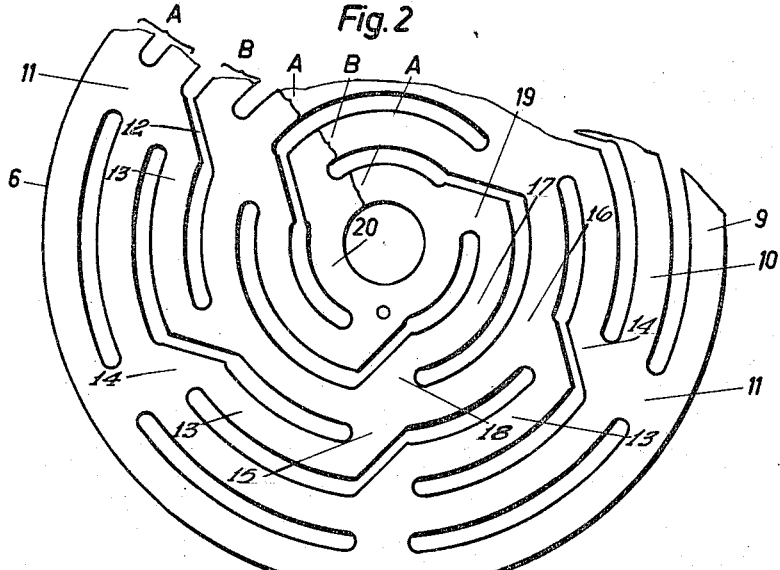

The plate valve illustrated in FIGS. 1 and 2 comprises a valve seat 1 and a valve guard 2, centered and positively interconnected by means of bolt 3 with nut 4. Between the valve seat 1 and the valve guard 2 a washer 5 is provided, which determines the distance between the aforesaid two members and simultaneously serves as a guide for the valve plate 6, slideably arranged between the valve seat 1 and the valve guard 2. The valve plate 6 is loaded by helical springs 7 located in emplacements 8 of the valve guard 2.

As appears from FIG. 2, the valve plate 6 comprises six concentric rings, of which the two outer rings 9 and 10 are solid and interconnected by means of webs 11, whereas the ring inwardly adjoining the ring 10 is subdivided by means of oblique slots into ring segments 13 connected at one extremity thereof via a web 14 with the ring 10 and at the other extremity via a web 15 with the solid ring 16. Adjoining the ring 16 is again a slotted ring subdivided into ring segments 17, said ring being connected via webs 18 with the ring 16 and via webs 19 with the solid innermost ring 20. Thus the valve plate 6 is subdivided into three rigid zones A comprising the solid rings 9, 10, 16 and 20, said zones being flexibly interconnected by means of flexible intermediate zones B comprising the ring segments 13 and 17.

When incorporated as shown in FIG. 1, the rigid zones A only are loaded by helical springs 7, whereas the rings constituting the flexible zones B are not spring-loaded but in this instance also controlling flow ports of the valve seat 1. According to the invention, the helical springs 7 are so dimensioned or distributed over the periphery of the valve plate 6, that the rigid zones A are loaded by closing forces of different amounts. Consequently, the individual zones A are lifted from the valve seat 1 at different points of time depending on the closing forces bearing upon said zones, and will not impinge upon the valve guard and the valve seat at the same time either. Thus, the pattern of the opening and closing operations of the valve can be regulated as required by the appropriate application of the closing forces.

Figure 3:
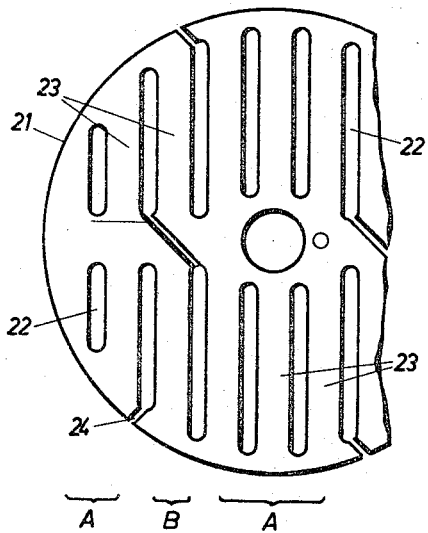

In the embodiment illustrated in FIG. 3 the circular valve plate 21 presents straight ports 22 so as to obtain parallel strips 23 interconnected by means of webs, part of said strips being separated from the adjacent strips by slots 24 extending obliquely through the webs, so that the solid strips 23 form rigid zones A flexibly interconnected by means of the flexible zones B formed by the slotted strips 23.

Figure 4:
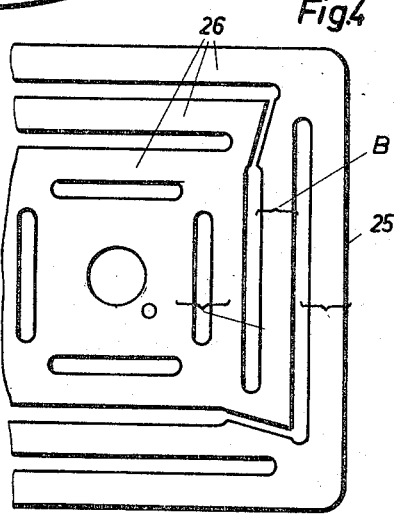

The valve plate 25 as shown in FIG. 4 is of rectangular shape and comprises strips 26 inserted one into the other frame-fashion and interconnected by means of diagonally extending webs. The successive frames formed by the strips 26 are alternatingly of the solid and of the slotted type, so that this valve plate according to the invention also comprises rigid zones A interconnected by elastic or flexible zones B. Likewise, the two valve plates 21 and 25 illustrated in FIGS. 3 and 4 can be loaded by closing forces of different amounts in the area of their rigid zones A, so that hard impacts of the valve plate during the operation of the valve are avoided and the opening and closing motions can be timed as required.

Figure 5:
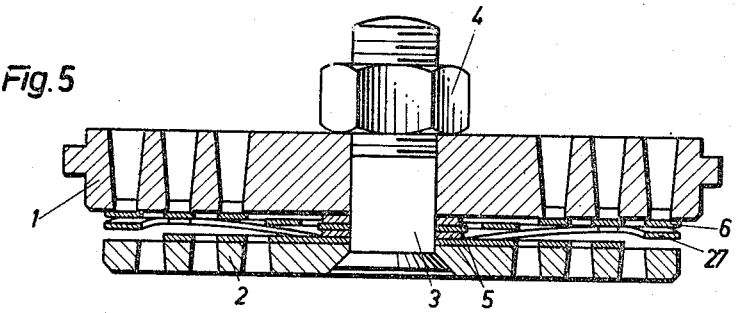
FIG. 5 is an axial cross-sectional view of a further embodiment of the invention, FIG. 6 a paln view of the valve plate and FIG. 7 a plan view of a spring plate.
Figure 6:
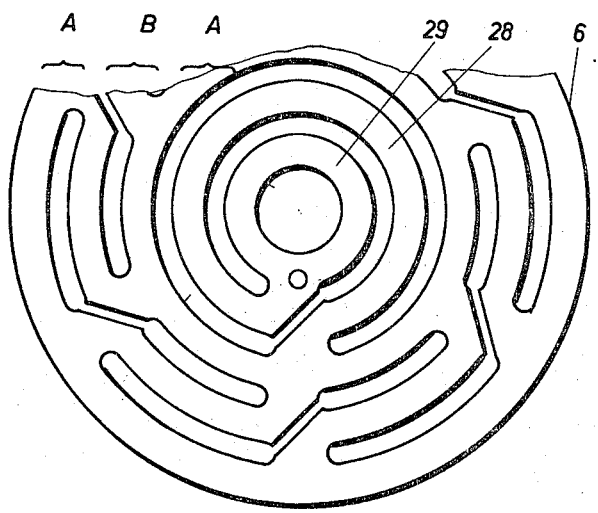
Figure 7:
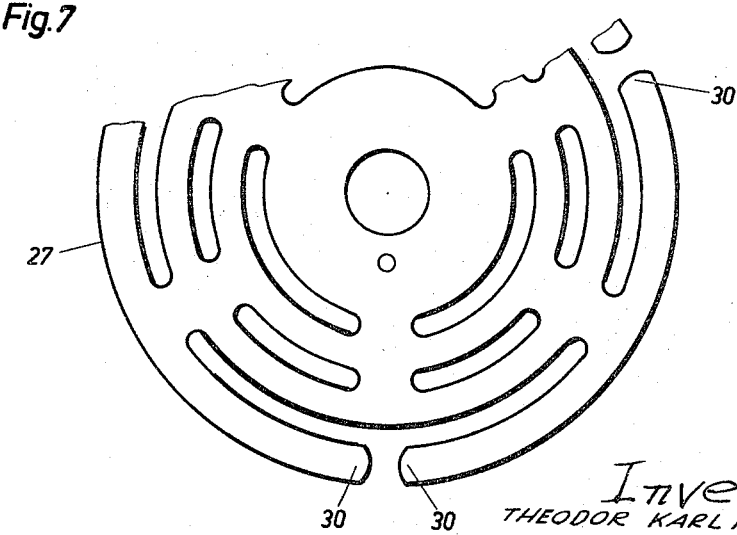

The embodiment shown in FIGS. 5 and 7, where identical elements are designated by the same reference symbols as in FIGS. 1 and 2, differs from the one illustrated in FIGS. 1 and 2 mainly in that the valve plate 6 as shown in FIG. 6 is guided, a spring plate 27 illustrated in FIG. 7 being used for spring-loading. Here too, the valve plate 6 is subdivided into rigid zones A and flexible intermediate zones B and in addition, equipped with a spiral-shaped guide 28, the hub 29 of which is clamped between two washers 5. The member 28 merely serves as a guide for the valve plate 6 so as to ensure that all zones A and B of the latter controlling ports perform the full stroke motion of the valve. However, the guide 28 can also be used for the control of ports. Another difference (nonessential as far as the invention is concerned) between the valve plates as shown in FIGS. 2 and 6 respectively, resides in the fact that in FIG. 6 the outer rigid zone A comprises a single solid ring only.

The spring plate 27 shown in FIG. 7 is of a conventional type. Its outermost ring is slotted and forms elastic or flexible tongues 30, whereas all of the inner rings are solid. When incorporated, the tongues 30 bear on the outer rigid zone A of the valve plate 6 only, whereas the inner rigid zone A and the flexible intermediate zone B are not springloaded. However, additional rings of the spring plate 27 can also be slotted and formed to flexible tongues so that in valve plates comprising a plurality of rigid zones, all or part of the rigid zones and if necessary, also the flexible zones are loaded by the same sprong plate.

I claim:
1. A plate valve, in particular for piston-type compressors, comprising a valve seat with flow ports therein and a valve guard arranged in spaced relation to the valve seat, a closing member disposed between the valve seat and the valve guard and on which the closing forces are achieved by spring loading, wherein the closing member consists of a flexible valve plate which comprises at least two rigid zones flexibly interconnected by means of flexible intermediate zones and loaded by closing forces of different amounts, at least the rigid zones covering passages of the valve seat and executing the complete stroke of the valve plate.

2. A plate valve as claimed in claim 1, wherein both the rigid zones and the flexible intermediate zones located between the rigid zones control passages and execute the full stroke motion of the valve.

3. A plate valve as claimed in claim 1, the flow ports being arranged ring-fashion in the valve seat, wherein the rigid zones of the valve plate consist of at least one solid ring, the flexible zones comprising ring segments, each of said ring segments being connected with the adjacent solid ring by means of a web.

4. A plate valve as claimed in claim 1, the flow ports being arranged ring-fashion in the valve seat, wherein the rigid zones of the valve plate consist of at least one solid ring, the flexible zones comprising ring segments, each of said ring segments being connected with the adjacent solid ring by means of a web, and the innermost rigid zone of the valve plate being without spring-loading individually.

5. A plate valve, in particular for piston-type compressors, comprising a valve seat with flow ports therein and a valve guard arranged in spaced relation to the valve seat, a closing member disposed between the valve seat and the valve guard and on which the closing forces are achieved by spring loading, wherein the closing member consists of a flexible valve plate which comprises at least two rigid zones flexibly interconnected by means of flexible intermediate zones and loaded by closing forces of different amounts, at least the rigid zones covering passages of the valve seat and one of the rigid zones of the valve plate being without spring-loading individually.

References Cited
UNITED STATES PATENTS

| | | | |
|---|---|---|---|
| 921,892 | 5/1909 | Rogler | 137—516.13 |
| 3,123,095 | 3/1964 | Kohler | 137—516.23 |

ALAN COHAN, *Primary Examiner.*

MARTIN P. SCHWADRON, *Examiner.*

D. ZOBKIW, *Assistant Examiner.*